United States Patent [19]

Jonsson et al.

[11] Patent Number: 5,688,590
[45] Date of Patent: Nov. 18, 1997

[54] HIGH HEAT RESISTANT MOLDED PARTS PRODUCED BY STRUCTURAL REACTION INJECTION MOLDING

[75] Inventors: E. Haakan Jonsson, Coraopolis; Kristen L. Parks, Wexford, both of Pa.; Harald Pielartzik, Krefeld, Germany; Philip E. Yeske, Pittsburgh; Douglas A. Wicks, Lebanon, both of Pa.

[73] Assignee: Bayer Corporation, Pittsburgh, Pa.

[21] Appl. No.: 517,541

[22] Filed: Aug. 21, 1995

[51] Int. Cl.$^6$ ............................................. C08G 18/32
[52] U.S. Cl. ............... 428/320.2; 264/258; 264/328.6; 428/423.1; 428/425.6; 525/920; 525/935
[58] Field of Search ..................... 264/258, 328.6, 264/328.18; 521/167; 528/60; 525/920, 935; 428/320.2, 423.1, 425.6

[56] References Cited

U.S. PATENT DOCUMENTS

| | | | |
|---|---|---|---|
| Re. 33,609 | 6/1991 | Nodelman | 264/53 |
| 4,146,688 | 3/1979 | Schwindt et al. | 521/159 |
| 4,218,543 | 8/1980 | Weber et al. | 521/51 |
| 4,435,349 | 3/1984 | Dominquez et al. | 264/257 |
| 4,595,742 | 6/1986 | Nalepa et al. | 528/64 |
| 4,610,835 | 9/1986 | Ghavamikia | 264/250 |
| 4,631,298 | 12/1986 | Presswood | 521/163 |
| 4,664,862 | 5/1987 | Ghavamikia | 264/257 |
| 4,781,876 | 11/1988 | Kia | 264/261 |
| 4,792,576 | 12/1988 | Nodelman | 521/174 |
| 4,794,129 | 12/1988 | Gillis, Jr. et al. | 521/121 |
| 4,810,444 | 3/1989 | Alberino et al. | 264/102 |
| 4,871,789 | 10/1989 | Martinez | 523/220 |
| 4,935,460 | 6/1990 | Cassidy et al. | 524/251 |
| 4,952,358 | 8/1990 | Okina et al. | 264/134 |
| 4,957,684 | 9/1990 | Kia | 264/257 |
| 4,983,659 | 1/1991 | Gillis et al. | 524/186 |
| 5,002,830 | 3/1991 | Gillis et al. | 264/331.19 |
| 5,009,821 | 4/1991 | Weaver | 264/22 |
| 5,059,634 | 10/1991 | Smith | 521/167 |
| 5,091,497 | 2/1992 | Grogler et al. | 528/76 |
| 5,118,459 | 6/1992 | Gillis et al. | 264/328.6 |
| 5,142,013 | 8/1992 | Cassidy et al. | 528/44 |
| 5,391,344 | 2/1995 | Rains et al. | 264/257 |
| 5,422,414 | 6/1995 | Smith | 528/60 |
| 5,500,176 | 3/1996 | Parks et al. | 264/257 |
| 5,502,147 | 3/1996 | Nodelman et al. | 528/49 |
| 5,529,739 | 6/1996 | Jonsson et al. | 264/300 |
| 5,536,465 | 7/1996 | Lesko | 521/167 |

FOREIGN PATENT DOCUMENTS

| | | |
|---|---|---|
| 354712 | 2/1990 | European Pat. Off. |
| 4022663 | 1/1992 | Germany. |
| 2-121816 | 5/1990 | Japan ............... 264/331.19 |

OTHER PUBLICATIONS

Chemical Abstracts, vol. 106, No. 8, Feb. 1987, Abstract No. 51481x, Kojim et al: "Urethane Rubber for Reaction Injection Molding", p. 59 Col. 1& JP-A-61 190 518 (Asahi Glass).

*Primary Examiner*—Jeffery R. Thurlow
*Attorney, Agent, or Firm*—Joseph C. Gil; N. Denise Brown

[57] ABSTRACT

The invention is directed to a process for preparing SRIM molded article. The process broadly requires the use of a fiber reinforcement mat which is placed inside the mold cavity, and then a polyurethane reaction system is injected into the mold. The system comprising a polyisocyanate and a blend of active hydrogen containing compounds requires aldimines as part of the blend of active hydrogen containing compounds.

6 Claims, No Drawings

HIGH HEAT RESISTANT MOLDED PARTS PRODUCED BY STRUCTURAL REACTION INJECTION MOLDING

BACKGROUND OF THE INVENTION

The present invention relates to aldimines as chain extenders in structural reaction injection molding (SRIM). It also relates to the molded articles produced according to this process, production of Class A surface articles from systems containing aldimines as chain extenders, and the articles produced therefrom.

Reaction injection molding (RIM) has become an important process for the manufacture of a wide variety of moldings. The RIM process is a process which involves the intimate mixing of a polyisocyanate component and an isocyanate-reactive component followed by the injection (generally under high pressure) of the mixture into a mold with subsequent rapid curing. U.S. Pat. No. 4,218,543 describes one particularly commercially significant RIM system, which requires the use of a specific type of aromatic amine as a crosslinker/chain extender. The preferred amine described in the '543 patent is diethyl toluene diamine (DETDA).

In the automotive industry, the application of RIM technology has been primarily to produce vertical parts (e.g. fenders and fascias) and has typically not been used in the production of horizontal body parts (e.g., trunks, hoods and roofs). In order to be useful for the production of horizontal body parts, the molded product 1) must have high stiffness, 2) must have a high quality surface, and 3) must be able to withstand the heat generated during further processing of the part (e.g., painting and curing the paint). Typically, such a part must have a flexural modulus of 750,000 psi or higher.

The structural RIM (SRIM) process is the same basic process as RIM, except that it requires a reinforcing mat to be placed inside the mold cavity prior to injecting the reaction mixture into the mold. For example, fiber glass reinforcement of polyurethane RIM parts is described in, e.g., U.S. Pat. Nos. 4,435,349, 4,792,576, and 4,871,789. When utilizing such fiber glass reinforcement, several problems are generally encountered, not the least of which is the production of a smooth surface (see, e.g., U.S. Pat. Nos. 4,610,835, 4,664,862, 4,781,876, 4,810,444, 4,952,358, 4,957,684, and 5,009,821).

In some cases, it is desirable to produce a fiber reinforced molded article which has a Class A surface. This is a variation of the SRIM process wherein surfacing veils are also placed inside the mold cavity prior to injecting the reaction mixture. For this type of surface, it is necessary for the molded article to have, for example, a smooth surface, low glass read-through, paintability, and high heat resistance. This type of article is typically painted and later cured. Accordingly, the article must be able to withstand blistering, etc. at curing temperatures as high as 150° C. Generally, this resistance to high temperatures can only be attained through the use of aromatic amine type chain extenders, including hindered amines.

In particular, U.S. Pat. No. 5,391,344 describes a process for preparing Class A surface, fiber-reinforced molded articles. The process broadly comprised injecting a specific formulation into a mold, allowing the formulation to fully react and removing the molded part from the mold. The formulation broadly required the use of a polymethylene poly(phenyl isocyanate) and a mixture of hydroxyl functional materials. While adequate for many applications, the formulation tended to blister after being subjected to further heat treatment at 150° C. (which is typical for curing of the paint).

Hindered amines are known for a variety of uses in the polyurethane art (see, e.g., U.S. Pat. Nos. 4,146,688, 4,595,742, 4,631,298 and 5,059,634).

Class A surface, fiber-reinforced molded articles are also described in U.S. patent application Ser. No. 08/261,544, filed on Jun. 17, 1994 (commonly assigned). This process describes formulations comprising a polymethylene poly (phenyl isocyanate) and a mixture of hydroxyl functional materials which contains a specified amount of hindered amines. Articles produced from these formulations containing hindered amines are capable of withstanding temperatures of up to 180° C. without blistering.

Various imino-functional and enamine-containing compounds, including aldimines, are described as suitable isocyanate-reactive compounds for reaction injection molding formulations in U.S. Pat. Nos. 4,794,129, 4,935,460, 4,983,659, 5,055,134, 5,114,480 and 5,142,013. These compounds are generally either chain extenders or prepolymers in the described polyurea compositions, and are always used in combination with aromatic amines such as, for example, diethyl toluene diamine (DETDA). Although these references broadly suggest that these reaction systems comprising an aromatic amine and either an imino-functional or enamine-containing compounds may be suitable for structural RIM (SRIM), there are no examples set forth illustrating this.

An object of the present invention was to provide SRIM molded articles (parts) based on a system having only aliphatic aldimines as urea-forming chain-extenders. It was found that there is no need for an additional urea-forming compound, such as, for example, an aromatic amine, in order to produce polyurethane-urea molded articles via the SRIM process which exhibit high heat resistance by using aldimines as the chain-extenders. This was surprising as it was previously believed that an aromatic amine (or other urea-forming compound) was necessary to produce polyurethane-urea composites having high heat resistance.

The formulations of the present invention contain about 20-40 parts aldimine (aliphatic) functional isocyanate-reactive ingredients, and about 60-80 parts hydroxy-functional isocyanate-reactive ingredients. These formulations result in composites having physical properties comparable to those of composites made from traditional formulations containing an aromatic amine, such as Ethacure-300 (dimethylthiotoluene diamine). It is also surprising that the SRIM composites produced from the aldimine containing formulations of the present application exhibit high-heat resistance characteristics, and specifically the ability of the surface to withstand heat without blistering, which are comparable to aromatic amine containing SRIM composites.

It was also found that the use of aliphatic aldimines rather than aromatic amines as chain-extenders, increases the elongation of the neat material. This is important for the deformation characteristics of the material.

DESCRIPTION OF THE INVENTION

The present invention is directed to an improved process for preparing a SRIM molded article which has excellent high temperature properties and which exhibits little or no blistering when subjected to temperatures as high as 150° C. The process can be used to produce horizontal, as well as vertical, automotive parts. The improved process comprises:

(A) providing a mold, having a cavity therein for forming the fiber reinforced molded article, wherein at least a portion of the mold cavity defines a mold cavity surface against the surface the article is to be molded, (B) laying one or more layers of fiber reinforcing mat against the mold cavity surface, (C) closing the mold, (D) injecting a reaction mixture via the RIM process into said mold cavity, (F) allowing the reaction mixture to fully react, and removing the resultant molded product from the mold, the improvement wherein said reaction mixture comprises (1) one or more polymethylene poly(phenyl isocyanates) (i) having a diisocyanate content of from 25 to less than 50% by weight, (ii) containing less than 2% by weight of 2,4'-methylene bis(phenyl isocyanate), and (iii) containing less than 0.5% by weight of 2,2'-methylene bis(phenyl isocyanate), and (2) a blend of active hydrogen containing compounds comprising:

(a) at least one polyether polyol having a hydroxyl functionality of from 2 to 8 and a molecular weight of from 350 to below 1800, (b) at least one hydroxyl functional organic material containing from 2 to 8 hydroxyl groups and having a molecular weight below 350, components (2)(a) and (2)(b) being used in a weight ratio of from about 10:1 to about 1:10, (c) no more than 45% by weight based on the total weight of components (a), (b), and (c), of one or more active hydrogen containing compounds having a molecular weight of 1800 or more, and (d) from about 20% to about 40% by weight, based upon the total weight of components (a), (b), (c) and (d) of one or more aldimines corresponding to the formula

wherein

X represents an organic group which has a valency of n and is obtained by removing the amino groups from a organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, wherein the amounts of components (2)(a), (2)(b), (2)(c) and (2)(d) total by weight, and components (1) and (2) are present in amounts such that the isocyanate index is from about 70 to about 130.

The present invention is also directed to molded articles produced by the above process.

One preferred embodiment of the present invention is an improved process for preparing a Class A surface, fiber reinforced molded article. This improved process comprises:

(A) providing a mold, having a cavity therein for forming the fiber reinforced molded article, wherein at least a portion of the mold cavity defines a mold cavity surface against the surface the article is to be molded, (B) laying one or more fiber surfacing veils against the mold cavity surface, (C) laying one or more layers of fiber reinforcing mat over said surfacing veil, (D) laying one or more fiber surfacing veils over said fiber mat, (E) closing the mold, (F) injecting a reaction mixture via the RIM process into said mold cavity, (G) allowing the reaction mixture to fully react, and removing the resultant molded product from the mold, the improvement wherein said reaction mixture comprises (1) one or more polymethylene poly(phenyl isocyanates) (i) having a diisocyanate content of from 25 to less than 50% by weight, (ii) containing less than 2% by weight of 2,4'-methylene bis(phenyl isocyanate), and (iii) containing less than 0.5% by weight of 2,2'-methylene bis(phenyl isocyanate), and (2) a blend of active hydrogen containing compounds comprising:

(a) at least one polyether polyol having a hydroxyl functionality of from 2 to 8 and a molecular weight of from 350 to below 1800, (b) at least one hydroxyl functional organic material containing from 2 to 8 hydroxyl groups and having a molecular weight below 350, components (2)(a) and (2)(b) being used in a weight ratio of from about 10:1 to about 1:10, (c) no more than 45% by weight based on the total weight of components (a), (b), and (c), of one or more active hydrogen containing compounds having a molecular weight of 1800 or more, and (d) from about 20% to about 40% by weight, based upon the total weight of components (a), (b), (c) and (d) of one or more aldimines corresponding to the formula

wherein

X represents an organic group which has a valency of n and is obtained by removing the amino groups from a organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, wherein the amounts of components (2)(a), (2)(b), (2)(c) and (2)(d) total by weight, and components (1) and (2) are present in amounts such that the isocyanate index is from about 70 to about 130.

The molded articles having a Class A surface produced by the above process are one preferred embodiment of the present invention.

Some of the components ((1), (2)(a), (2)(b) and (2)(c)) useful herein are known in the art. The isocyanates, the hydroxy functional materials and the relatively high molecular weight active hydrogen containing materials are described in U.S. Pat. No. 4,792,576, the disclosure of which is herein incorporated by reference.

Starting polyisocyanate components (1) suitable for use in the present invention are polymethylene poly(phenyl isocyanates) (i) having a diisocyanate content of from 25 to less than 50% by weight, (ii) containing less than 2% by weight of 2,4'-methylene bis(phenyl isocyanate), and (iii)

containing less than 0.5% by weight of 2,2'-methylene bis(phenyl isocyanate). The isocyanates generally have isocyanate group contents of from 25 to 35% by weight, and preferably from 27 to 32% by weight.

The blend of active hydrogen containing compounds (2) used according to the present invention must include (a) a polyether polyol having a molecular weight of from 350 to below 1800 and (b) a polyhydroxy material having a molecular weight below 350, and may include (c) up to 45% by weight of one or more active hydrogen containing compounds having molecular weights of more than 1800 and having functionalities of 2 to 8. The blend of active hydrogen containing compounds also comprises (d) about 20–40% by weight of one or more aldimines. Except for the aldimine compounds, it is preferred that no other urea-forming compounds, particularly compounds containing aromatically-bound amine groups, are present in the blend of active hydrogen containing compounds.

Polyethers having molecular weights of from 350 to below 1800 containing two to four hydroxy groups are preferred as component (2)(a). Useful polyethers are known and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane glycerine, 4,4'-dihydroxy diphenyl propane, aniline, ammonia, ethanolamine and ethylene diamine.

Compounds containing at least two hydroxyl groups and having molecular weights of below 350 are also used in the present invention ((2)(b)). These materials preferably contain 2 or 3 hydroxyl groups. Mixtures of different compounds containing at least two hydroxyl groups and having molecular weight of less than 350 may also be used. Examples of such low molecular weight compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl, 3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, diethylene glycol, triethylene glycol, tetraethylene glycol, higher polyethylene glycols having molecular weights of less than 350, dipropylene glycol, higher polypropylene glycols having molecular weights of less than 350, dibutylene glycol, higher polybutylene glycols having a molecular weight of less than 400, 4,4'-dihydroxy diphenyl propane, dihydroxy methyl hydroquinone, and the like.

Other low molecular weight polyols having a molecular weight of less than 350 which may be used in accordance with the present invention include ester diols, diol urethanes and diol ureas of the type described in U.S. Pat. No. 4,972,576, the disclosure of which is herein incorporated by reference.

For certain purposes, it may be advantageous to use polyols containing sulfonate and/or phosphonate groups (German Offenlegungsschrift 2,719,372), such as the adduct of bisulfite with 1,4-butene diol or the alkoxylation product thereof.

The higher molecular weight, isocyanate reactive materials useful herein (component (2)(c)) are known in the polyurethane art and include hydroxyl containing materials.

Preferred are relatively high molecular weight polyethers having molecular weights of above 1800 and having hydroxyl functionalities of from 2 to 4. The molecular weights are number average molecular weights ($M_n$) and are determined by end group analysis (OH number).

The key to the present invention resides in using at least one aldimine corresponding to the formula:

X—[N=CHCH($R_1$)($R_2$)]$_n$ wherein

X represents an organic group which has a valency of n and is obtained by removing the amino groups from a organic polyamine having (cyclo)aliphatically-bound amino groups, $R_1$ and $R_2$ may be identical or different and represent organic groups which am inert towards isocyanate groups at a temperature of 100° C. or less, or $R_1$ and $R_2$ together with the β-carbon atom form a cycloaliphatic or heterocyclic ring, and n represents an integer having a value of at least 2.

Suitable aldimines for use in combination with the blend of hydrogen containing components include those prepared from an aldehyde and polyamines containing two or more, preferably 2 to 6 and more preferably 2 to 4, (cyclo) aliphatically-bound, primary amino groups. Suitable polyamines include those compounds having molecular weights below 400. Examples of these polyamines are those wherein the amino groups are attached to aliphatic and/or cycloaliphatic atoms.

These compounds are prepared in known manner by reacting primary polyamines corresponding to the formula

X—(—$NH_2$)$_n$     (II)

wherein

X and n are as defined above, with aldehydes corresponding to the formula

O=CHCH($R_1$)($R_2$)     (III)

wherein $R_1$ and $R_2$ are as defined above.

Suitable low molecular weight polyamines starting compounds include tetramethylene diamine, ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1, 5-pentane diamine, 1,6-hexane diamine, 1,7-heptane diamine, 1,8-octane diamine, 1,9-nonane diamine, 1,10-decane diamine, 1,11-dodecane diamine, 1-amino-3-aminomethyl-3,5,5-trimethyl cyclohexane, bis-(4-aminocyclohexyl)-methane, bis-(4-amino-3-methylcyclohexyl)-methane, 1,2- and/or 1,4-cyclohexane diamine, 1,3-bis(methylamino)-cyclohexane, 1,3-diamino-4-methylcyclohexane, 1,8-p-menthane diamine, hydrazine, hydrazides of semicarbazido carboxylic acids, bis-hydrazides, bis-semicarbazides, N,N,N-tris-(2-aminoethyl)-amine, guanidine, N-(2-aminoethyl)-1,3-propane diamine, etc.

Preferred polyamines are 11-amino-3-aminomethyl-3,5, 5-trimethylcyclohexane (isophorone diamine or IPDA), bis-(4-aminocyclohexyl)-methane, 1,3-diamino-4- methylcyclohexane, 1,6-diaminohexane, 2-methyl-1,5-pentamethylene diamine and ethylene diamine.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde. A preferred aldehyde is isobutyraldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

The reinforcing mats useful in this invention comprise glass mats, graphite mats, polyester mats, polyaramid mats such as KEVLAR mats and mats made from any fibrous material. The preferred mats are glass mats, with continuous strand glass mats being particularly preferred. Typical useful mats are described in the examples set forth in U.S. Pat. No. 4,792,576. Although the mats used in the examples of the present invention are random continuous strand mats made of glass fiber bundles, woven mats and oriented mats such as uniaxial or triaxial mats may also be used. Depending upon the weight of the particular reinforcing mat chosen, more than one sheet of mat may have to be used in order to reach the required weight. It is preferred that a sufficient number of mats are present to provide 15–60% by weight, most preferably 40–60% by weight, based on the total weight of the molded product.

In one preferred embodiment wherein Class A surfaces are produced by a preferred embodiment of the SRIM process, both the reinforcing mats as described above and fiber surfacing veils are used in the process. One (or more) surfacing veils are placed against the mold cavity surface, one (or more) layers of fiber reinforcing mats is laid over the surfacing veil, one (or more) surfacing veil is laid over the fiber mat, the mold is closed and the process proceeds as in the basic SRIM process.

The fiber surfacing veils useful herein are generally commercially available. As is known, surfacing veils (or mats) are generally highly filamentized polyester or fiberglass, used primarily to produce a smooth surface on a reinforced plastic laminate. Polyester fiber surfacing veils are generally not preferred since they tend to be more expensive than fiberglass veils and since they tend to shift during molding. Accordingly, it is preferred to use glass fiber surfacing veils. Suitable commercial glass fiber surfacing veils include Surmat SF 100, available from Nicofibers, Schmelzer Industries veil, available from GLS Fiberglass, Viledon glass veils, available from Freudenberg. It is preferred that the surfacing veil be used in an amount of at least 0.02 lbs/ft$^2$. Depending upon the weight of the particular veil chosen, more than one sheet of veil may have to be used in order to reach the preferred weight. The upper limit is generally set by economic considerations. The surfacing veil should be placed on the mold surface and substantially the same amount should be placed on the reinforcing mat. It is most preferred that exactly the same weight of veil be placed on the mold surface and on the reinforcing mat, since if substantially different weights are used, part warpage may result.

For Class A surfaces, it is preferred to use a mold wherein the mold cavity surface has an SPI-SPE polished rating of at least 3. Furthermore, the surfacing veils are preferably glass fiber veils. In each of steps (B) and (D) of this process, the amount of veil used is preferably at least 0.02 lbs/ft$^2$. In addition, the amount of reinforcing mat is preferably at least 0.1 lbs/ft$^2$, and most preferably at least 0.2 lbs/ft$^2$. The total amount of surfacing veils and reinforcing mat is preferably such that the total amount of fiber in the molded article is from 15 to 45% by weight, and most preferably from 20 to 35% by weight, based upon the total weight of the molded product. When the reaction mixture is introduced into the mold, it fills the mold cavity, simultaneously impregnates the reinforcing mat and deforms the veil into intimate contact with the mold cavity surface.

In general, the final thickness of the molded part is no thicker than 120 thousandths of an inch. The surface of the part is a Class A surface, and the flexural modulus of the part is in excess of about 750,000 psi. Finally, the part is able to withstand heat over a broad range of temperatures up to about 150° C.

Catalysts may also be used in the invention. Suitable catalysts include those known per se, for example tertiary amines such as triethylamine, tributylamine, N-methylmorpholine, N-ethylmorpholine, N-cocomorpholine, N,N,N',N'-tetramethylethylene diamine, 1,4-diazabicyclo-(2,2,2)-octane, 1,5-diazabicyclo-5,4,0-undec-5-ene, N-methyl-N'-dimethylaminoethyl piperazine, N,N-dimethylbenzylamine, bis-(N,N-diethylaminoethyl)-adipate, N,N-diethyl-benzylamine, pentamethyldiethylene triamine, N,N-dimethylcyclohexyl-amine, N,N,N',N'-tetramethyl-1,3-butane diamine, N,N-dimethyl-β-phenyl-ethylamine, 1,2-dimethylimidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

Other suitable catalysts are silaamines having carbon silicon bonds of the kind described in German Pat. No. 1,229,290. These include 2,2,4-trimethyl-2-silamorpholine and 1,3-diethylaminomethyl tetramethyl disiloxane.

Nitrogen-containing bases such as tetraalkyl ammonium hydroxides; alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and details on the way in which the catalysts work can be found in Kunststoff-Handbuch, Vol. VII, published by Vieweg and Hochtlen, Carl-Hanser-Verlag, Munich 1966 page 96–102.

The catalysts are generally used in quantities of from about 0.001 to 10% by weight, based on the quantity of isocyanate reactive compounds.

Surface-active additives can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

It is also possible to use pigments or dyes and flameproofing agents known per se, such as tris-chloroethyl phosphate or ammonium phosphate and poly-phosphate and Mobil's Antiblaze 19 flame retardant. Stabilizers against the effects of aging and weather, plasticizers and substances with fungistatic and bacteriostatic effects, and fillers such as mica, barium sulphate, kieselguhr, carbon black or prepared chalk may also be used.

It is also preferred that so-called external and/or internal mold release agents be used. Suitable internal mold release agents include those described in U.S. Pat. Nos. 4,585,803, 4,581,386 and 4,519,965, the disclosures of which are herein incorporated by reference. Also useful are those internal mold release agents described in German Offenlegungsschriften 1,953,637 and 2,121,670.

The invention is further illustrated but is not intended to be limited by the following examples in which all parts and percentages are by weight unless otherwise specified.

EXAMPLES

Experimental Procedure for the Synthesis of 1,6-diaminohexane-N,N'-di(2-methylpropylidene)

To a 5 liter 4-neck flask equipped with an overhead stirrer, a Dean-Stark trap, an addition funnel and a thermocouple/nitrogen inlet, 1304 g (18.072 moles) isobutyraldehyde were added. 1000 g (8.605 moles) 1,6-hexane-diamine were dissolved in 248 g of water and the solution was poured into the addition funnel. After purging the system with nitrogen gas, the hexanediamine solution was slowly added to the isobutyraldehyde under stirring. The temperature was controlled so that it did not exceed 30° C. The reaction mixture was stirred for one hour at ambient temperature and was then let to stand without stirring. After one hour, 450 ml of water was siphoned off from the bottom of the flask. The temperature was then increased to 35° C. and the residual water was distilled off by cautiously applying vacuum. By the use of infrared (IR) spectroscopy, the water was determined to be completely removed after 3 hours at <2 mm/Hg. IR also confirmed that no unreacted amine was present.

Examples 1–8

Urethane-Urea Systems

The urethane systems described in each example were processed on a Hennecke HK-245 machine using a 10 MM Kraus Maffei mixing head. The mixture was injected into a 15×15×⅛ in. steel tool held in a 30 ton press. Material temperatures were maintained at 90° F., and the mold cavity was maintained at 185° F. The components were mixed at the appropriate weight ratio at impingement pressures of about 2000 psi. The mold was cleaned prior to injection with an N-methyl pyrrolidone based cleaner. The mold surface was treated with a base coat of Chemtrend R2080 paste wax and a light spray of Chemtrend CT-2006. Five layers of 2 oz./ft.² continuous strand fiberglass mat (Owens Corning M-8610) were placed in the mold and the chemical mixture was injected. Examples 1–4 below did not contain any reinforcing mats. After 2 minutes, the part was demolded with no residual material left on the mold.

The following polyol blends were used in the examples:

POLYOL BLEND A: a mixture of
i) 30 parts by weight of a polyoxypropylene diol adduct having a molecular weight of about 425,
ii) 20 parts by weight of a 356 molecular weight adduct of ethylene diamine and propylene oxide,
iii) 20 parts by weight of a 240 molecular weight adduct of mono-ethanolamine and propylene oxide, and
iv) 30 parts by weight of Ethacure 300: a mixture of 3,5-dimethylthio-2,4-toluenediamine and 3,5-dimethylthio-2,6-toluenediamine; commercially available from Ethyl Corporation.

POLYOL BLEND B: a mixture of
i) 30 parts by weight of a polyoxypropylene diol adduct having a molecular weight of about 425,
ii) 20 parts by weight of a 356 molecular weight adduct of ethylene diamine and propylene oxide,
iii) 20 parts by weight of a 240 molecular weight adduct of mono-ethanolamine and propylene oxide, and
iv) 30 parts by weight of 2-methyl-1,5-diaminopentane-N,N'-di(2-methylpropylidene) (prepared by the reaction of isobutyraldehyde and 2-methyl(-1,5-pentanediamine).

POLYOL BLEND C: a mixture of
i) 30 parts by weight of a polyoxypropylene diol adduct having a molecular weight of about 425,
ii) 20 parts by weight of a 356 molecular weight adduct of ethylene diamine and propylene oxide,
iii) 20 parts by weight of a 240 molecular weight adduct of mono-ethanolamine and propylene oxide, and
iv) 30 parts by weight of 1,6-diaminohexane-N,N'-di(2-methylpropylidene) (prepared by the reaction of isobutyraldehyde and 1,6-hexanediamine as described above).

POLYOL BLEND D: a mixture of
i) 30 parts by weight of a polyoxypropylene diol adduct having a molecular weight of about 425,
ii) 20 parts by weight of a 356 molecular weight adduct of ethylene diamine and propylene oxide,
iii) 20 parts by weight of a 240 molecular weight adduct of mono-ethanolamine and propylene oxide, and
iv) 30 parts by weight of 4,4'-methylenebis(cyclohexylamine)-N,N'-di(2-methylpropylidene) (prepared by the reaction of isobutyraldehyde and 4,4'-methylenebis(cyclohexylamine)).

CAT A: triethylenediamine, commercially available as Dabco 33LV from Air Products.

CAT B: SA 610-50, commercially available from Air Products. 1,5-diazabicyclo-5.4.0-undec-5-ene.

ISO: a polymethylene poly(phenyl isocyanate), having a diisocyanate content of about 43 by weight, containing 2.2% by weight of 2,4'-methylene bis(phenyl isocyanate) and 39.9% by weight of, 4,4'-methylene bis(phenyl isocyanate). The isocyanate has an isocyanate group content of 32 by weight and a viscosity at 25° C. of 203 mPa·s.

M8610: a continuous strand fiberglass mat, commercially available from Owens Corning Fiberglass; each individual mat weighs 2 oz./ft².

MOLD RELEASE CT-2006: a naphtha based wax emulsion commercially available from Chemtrend.

MOLD RELEASE R-2080: a naphtha based wax emulsion commercially available from Chemtrend.

These materials were combined to yield the different B-sides as shown in Table 1 below. The catalysts were mixed with the Polyol blend in the appropriate amount.

TABLE 1

| | Polyol A | Polyol B | Polyol C | Polyol D | Catalyst A | Catalyst B |
|---|---|---|---|---|---|---|
| Ex. 1 | 100 | | | | 0.5 | 0.5 |
| Ex. 2 | | 100 | | | 0.5 | 0.5 |
| Ex. 3 | | | 100 | | 0.5 | 0.5 |
| Ex. 4 | | | | 100 | 0.5 | 0.5 |
| Ex. 5 | 100 | | | | 0.5 | 0.5 |
| Ex. 6 | | 100 | | | 0.5 | 0.5 |
| Ex. 7 | | | 100 | | 0.5 | 0.5 |
| Ex. 8 | | | | 100 | 0.5 | 0.5 |

These B-sides were then reacted with the isocyanate in the weight ratios shown below, optionally using reinforcing mats (see Table 2 below). The weight ratios of isocyanate to polyol blend (where the blend included the catalyst) were as follows:

Examples 1 and 5: 124:100

Examples 2, 3, 6 and 7: 123:100

Examples 4 and 8: 113:100

TABLE 2

| Example No. | Reinforcement | Quantity (oz/ft$^2$) |
|---|---|---|
| Example 1 | no | |
| Example 2 | no | |
| Example 3 | no | |
| Example 4 | no | |
| Example 5* | yes | 10 |
| Example 6* | yes | 10 |
| Example 7* | yes | 10 |
| Example 8* | yes | 10 |

*Five mats each weighing 2 oz/ft$^2$ were used in Examples 5 through 8, to yield a total weight of 10 oz/ft$^2$ in those examples.

The produced samples were tested for tensile strength (ASTM D-638), flexural modulus (ASTM D-790), density (ASTM D-792), and heat distortion (ASTM D-648). The surface heat resistance was tested by applying a heat sensitive tape (Thermolable from Paper Thermometer Company) that registers the maximum exposure temperature to the sample surface, and monitoring the surface appearance while heating the sample in a temperature controlled oven.

TABLE 3

| | Physical Properties | | | | | | |
|---|---|---|---|---|---|---|---|
| Example | Density (lb/ft$^3$) | Tensile Strength (psi) | Tensile Elongation (%) | Flexural Strength (psi) | Flexural Modulus (psi) | Heat Distortion Temp. (°C.) | Surface Heat Resistance (°C.) |
| 1 | 74.60 | 6,776 | 1.5 | 16,960 | 530,400 | 220 | |
| 2 | 71.48 | 9,656 | 5.5 | 17,520 | 458,200 | 198 | |
| 3 | 71.46 | 9,605 | 5.4 | 17,350 | 451,500 | 211 | |
| 4 | 72.20 | 10,340 | 4.3 | 13,700 | 284,100 | 176 | |
| 5 | 104.23 | 37,280 | 2.2 | 60,060 | 2,251,000 | >220 | 177 |
| 6 | 98.78 | 36,450 | 2.3 | 58,350 | 2,068,000 | >220 | 149 |
| 7 | 101.83 | 27,960 | 2.2 | 46,550 | 1,737,000 | >220 | 168 |
| 8 | 96.98 | 34,080 | 2.2 | 49,660 | 1,784,000 | >220 | 168 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. In a process for preparing a SRIM molded article comprising:
   (A) providing a mold, having a cavity therein for forming the SRIM reinforced molded article, wherein at least a portion of the mold cavity defines a mold cavity surface against which surface the article is to be molded,
   (B) laying one or more layers of fiber reinforcing mat against the mold cavity surface,
   (C) closing the mold,
   (D) injecting a reaction mixture via the RIM process into said mold cavity,
   and
   (E) allowing the reaction mixture to fully react, and removing the resultant molded product from the mold, the improvement wherein said reaction mixture comprises
   (1) one or more polymethylene poly(phenyl isocyanates)
      (i) having a diisocyanate content of from 25 to less than 50% by weight, (ii) containing less than about 2% by weight of 2,4'-methylene bis(phenyl isocyanate), and (iii) containing less than about 0.5% by weight of 2,2'-methylene bis(phenyl isocyanate), and
   (2) a blend of active hydrogen containing compounds consisting essentially of:
      (a) at least one polyether polyol having an hydroxyl functionality of from 2 to 8 and a molecular weight of from 350 to below 1800,
      (b) at least one hydroxyl functional organic material containing from 2 to 8 hydroxyl groups and having a molecular weight below 350, components (2)(a) and (2)(b) being used in a weight ratio of from about 10:1 to about 1:10,
      (c) no more than 45% by weight based on the total weight of components (a), (b), and (c), of one or more active hydrogen containing compounds having a molecular weight of 1800 or more, and
      (d) from about 20% to about 40% by weight, based upon the total weight of components (a), (b), (c) and (d) of one or more aldimines corresponding to the formula $$X\text{---}[N\text{=}CHCH(R_1(R_2)]_n$$

wherein

X represents an organic group which has a valency of n and is obtained by removing the amino groups from a organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, wherein the amounts of components (2)(a), (2)(b), (2)(c) and (2)(d) total by weight, and components (1) and (2) are present in amounts such that the isocyanate index is from about 70 to about 130.

2. The process of claim 1, wherein said aldimine is selected from the group consisting of 2-methyl-1,5-diaminopentane-N,N'-di(2-methylpropylidene), 1,6-diaminohexane-N,N'-di(2-methylpropylidene), 4,4'-methylenebis(cyclohexylamine)-N,N'-di(2-methylpropylidene), and mixtures thereof.

3. The molded article produced by the process of claim 1.

4. In a process for preparing a Class A surface, fiber reinforced molded article comprising (A) providing a mold, having a cavity therein for forming the fiber reinforced molded article, wherein at least a portion of the mold cavity defines a mold cavity surface against which surface the article is to be molded, (B) laying one or more fiber surfacing veils against the mold cavity surface, (C) laying one or more layers of fiber reinforcing mat over said surfacing veil, (D) laying one or more fiber surfacing veils over said fiber mat, (E) closing the mold, (F) injecting a reaction mixture via the RIM process into said mold cavity, (G) allowing the reaction mixture to fully react, and removing the resultant molded product from the mold, the improvement wherein said reaction mixture comprises (1) one or more polymethylene poly(phenyl isocyanates)
 (i) having a diisocyanate content of from 25 to less than 50% by weight, (ii) containing less than about 2% by weight of 2,4'-methylene bis(phenyl isocyanate), and (iii) containing less than about 0.5% by weight of 2,2'-methylene bis(phenyl isocyanate), and (2) a blend of active hydrogen containing compounds consisting essentially of:

(a) at least one polyether polyol having an hydroxyl functionality of from 2 to 8 and a molecular weight of from 350 to below 1800, (b) at least one hydroxyl functional organic material containing from 2 to 8 hydroxyl groups and having a molecular weight below 350, components (2)(a) and (2)(b) being used in a weight ratio of from about 10:1 to about 1:10, (c) no more than 45% by weight based on the total weight of components (a), (b), and (c), of one or more active hydrogen containing compounds having a molecular weight of 1800 or more, and (d) from about 20% to about 40% by weight, based upon the total weight of components (a), (b), (c) and (d) of one or more aldimines corresponding to the formula

wherein

X represents an organic group which has a valency of n and is obtained by removing the amino groups from a organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, wherein the amounts of components (2)(a), (2)(b), (2)(c) and (2)(d) total 100% by weight, and components (1) and (2) are present in amounts such that the isocyanate index is from about 70 to about 130.

5. The process of claim 4, wherein said aldimine is selected from the group consisting of 2-methyl-1,5-diaminopentane-N,N'-di(2-methylpropylidene), 1,6-diaminohexane-N,N'-di(2-methylpropylidene), 4,4'-methylenebis(cyclohexylamine)-N,N'-di(2-methylpropylidene), and mixtures thereof.

6. A molded article having a Class A surface and being produced by the process of claim 4.

* * * * *